US006200358B1

(12) United States Patent
Fleischer et al.

(10) Patent No.: US 6,200,358 B1
(45) Date of Patent: Mar. 13, 2001

(54) ADDITIVE FOR A FUEL TO NEUTRALIZE SULFUR DIOXIDE AND/OR SULFUR TRIOXIDE IN THE EXHAUST GASES

(75) Inventors: Holger Fleischer, Bad Liebenzell; Eberhard Hirsch, Maulbronn; Karl-Heinz Thiemann, Korb, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/296,661

(22) Filed: Apr. 23, 1999

(30) Foreign Application Priority Data

Apr. 24, 1998 (DE) .............................................. 198 18 536

(51) Int. Cl.$^7$ ....................................................... C10L 1/30
(52) U.S. Cl. .................... 44/300; 44/457; 44/458
(58) Field of Search ............................ 44/354, 355, 357, 44/457, 458, 300

(56) References Cited

U.S. PATENT DOCUMENTS

| | | | | |
|---|---|---|---|---|
| 3,837,820 | * | 9/1974 | Kakin | 44/354 |
| 4,579,070 | * | 4/1986 | Lin et al. | 110/345 |
| 4,664,677 | * | 5/1987 | Dorer, Jr. et al. | 44/363 |
| 4,842,617 | * | 6/1989 | Kukin | 44/320 |
| 5,312,605 | * | 5/1994 | Levendis et al. | 423/210 |
| 5,501,714 | * | 3/1996 | Valentine et al. | 44/359 |
| 5,643,543 | * | 7/1997 | Giubard et al. | 423/213.5 |
| 5,919,276 | * | 7/1999 | Jeffrey | 44/374 |

FOREIGN PATENT DOCUMENTS

| | | |
|---|---|---|
| 33 06 795 C1 | 2/1983 | (DE) . |
| 32 34 315 A1 | 3/1984 | (DE) . |
| 38 40 212 C2 | 6/1989 | (DE) . |
| 39 32 322 A1 | 4/1991 | (DE) . |
| 50-117805 | 9/1975 | (JP) . |
| 53-019307 | 2/1978 | (JP) . |
| 54-081536 | 6/1979 | (JP) . |
| 54-095605 | 7/1979 | (JP) . |
| 61-204955 | 12/1986 | (JP) . |
| 2-9935 | 1/1990 | (JP) . |

* cited by examiner

*Primary Examiner*—Jacqueline V. Howard
(74) *Attorney, Agent, or Firm*—Evenson, McKeown, Edwards & Lenahan, P.L.L.C.

(57) ABSTRACT

The present invention relates to an additive for a fuel for the neutralization of $SO_2$ and/or $SO_3$ in the exhaust gases of internal combustion engines operated with the fuel, and a method for the neutralization of $SO_2$ and/or $SO_3$ in the exhaust gases of internal combustion engines. According to the invention, the additive contains one or more metal compounds soluble in the fuel. In the combustion of the fuel these compounds form stable sulfates which are present in solid particles in the exhaust gas. The method of the invention is characterized in that one or more of these additives are added to the fuel and the combustion of the fuel takes place in an oxidizing atmosphere.

10 Claims, No Drawings

ADDITIVE FOR A FUEL TO NEUTRALIZE SULFUR DIOXIDE AND/OR SULFUR TRIOXIDE IN THE EXHAUST GASES

BACKGROUND AND SUMMARY OF THE INVENTION

The present invention relates to an additive for a fuel to neutralize sulfur dioxide and/or sulfur trioxide in the exhaust gases of internal combustion engines powered by the fuel, as well as a method for the neutralization of sulfur dioxide and/or sulfur trioxide in such internal combustion engines.

This application claims the priority of German application no. 198 18 536.7, filed Apr. 24, 1998, the disclosure of which is expressly incorporated by reference herein.

The exhaust gases of internal combustion engines always contain sulfur in the form of sulfur dioxide and/or sulfur trioxide. Consequently, an undesired sulfuric acid exhaust gas can form. Also, these sulfur compounds interfere with the catalytic exhaust gas cleaning of Otto-cycle and Diesel engines. The elimination of these sulfur oxides from the exhaust gases is therefore desirable.

A special problem is encountered in connection with so-called $NO_x$ accumulator catalysts which are seen as a possible alternative to nitrogen oxide elimination in internal combustion engines, especially in lean-mix and Otto-cycle engines. The $NO_x$ accumulation medium consists substantially of barium and/or strontium compounds which are mixed with aluminum oxide. However, due to the manner of operation of this catalyst and the material used for the accumulation of $NO_x$, problems with the sulfur accumulation in the exhaust gas can occur. This is the result of the following considerations: the lambda number is known as a measure of the ratio of the amount of air or oxygen introduced into the combustion chamber of an internal combustion engine that is theoretically necessary for complete combustion. In internal combustion engines, the lambda number indicates the ratio of the total oxygen to the amount of oxygen that is needed for the complete combustion of the air and fuel mixture in the cylinder. Internal combustion engines with exhaust cleaning by controlled three-way catalysts must be operated at lambda number 1 and, if $NO_x$-accumulating catalysts are used, at lambda number 1 or greater, so as to permit optimum exhaust gas cleaning. In the case of a high air-to-fuel ratio, i.e., in an oxidizing atmosphere (lambda≧1), however, two reactions compete with one another in the $NO_x$ accumulator-catalyst:

1. The nitrogen oxide $NO_2$ reacts with the barium carbonate in the desired absorption reaction to form barium nitrate:

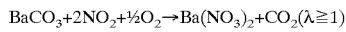
   $BaCO_3 + 2NO_2 + \frac{1}{2}O_2 \rightarrow Ba(NO_3)_2 + CO_2 (\lambda \geq 1)$ 2. The sulfur reacts as sulfur trioxide with barium carbonate to form barium sulfate:

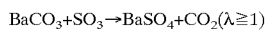
   $BaCO_3 + SO_3 \rightarrow BaSO_4 + CO_2 (\lambda \geq 1)$

Therefore the absorption potential for nitrogen oxides is lost, and the catalyst becomes contaminated.

In addition, the reaction preferentially leads to the very stable barium sulfate if sulfur trioxide is present in the exhaust gas. In the combustion of sulfur from the fuel and the oil only sulfur dioxide is formed. However where there are air:fuel ratios (lambda≧1), the sulfur dioxide is oxidized to sulfur trioxide. This reaction is retarded with the increasing temperature of the internal combustion engine.

This differs from Otto-cycle engines in passenger vehicles and Diesel engines of passenger vehicles and utility vehicles, where it has been shown that the formation of sulfates virtually cannot be suppressed. This indicates that, even at higher temperatures, sufficient sulfur trioxide is formed. Since most of the sulfur originates from the fuel (5–700 ppm depending on the quality) the life of $NO_x$ accumulator catalysts is thus limited.

In the firing of power plants and waste incinerators it is known to feed into the fire sulfur-binding substances such as alkali and alkaline earth carbonates, as well as alkali and alkaline earth oxides (DE 33 06 795 C1, DE 32 34 315 A1, DE 38 40 212 C2). It is furthermore known to add metal salts of organic acids to such fires in order to reduce the emission of sulfur dioxide and sulfur trioxide (JP 50-117 805 A, JP 54-081 536 A). However, these methods are not transferable to internal combustion engines.

The present invention relates to the problem of providing an additive and a method that will permit reliable desulfurization of the exhaust gases of internal combustion engines.

The present invention accomplishes this by adding an additive comprising one or more metal compounds that are soluble in fuel and which in the combustion of the fuel form stable sulfates which are present in solid form in the exhaust gas.

Thus, according to the invention, sulfur dioxide and sulfur trioxide are bound in the form of stable sulfates which form in the combustion and whereby they are discharged in the form of solid particles together with the exhaust gas from the internal combustion engine. The metal sulfate particles can then be deposited themselves in the exhaust tract, for example in the muffler, or they can be blown out of the tail pipe. In this manner a reliable desulfurization of the exhaust gases is achieved. Moreover, the contamination of the $NO_x$ catalytic accumulator is avoided.

Other objects, advantages and novel features of the present invention will become apparent from the following detailed description of the invention.

DETAILED DESCRIPTION OF THE PREFERRED EMBODIMENTS

The metal compounds soluble in the fuel are preferably inorganic or organometallic compounds, such as salts of inorganic or organic acids as well as inorganic or organometallic complex compounds.

The stable sulfates are formed by compounds of divalent metals such as magnesium, calcium and strontium, as well as molybdenum, cadmium and lead, and by divalent transition metals such as vanadium, chromium, manganese, iron, cobalt, nickel, copper and zinc. These metal compounds are thermally degraded in the combustion of the fuel and form metal oxides, which in turn react with $SO_2$ and $SO_3$ to form stable sulfate.

An embodiment of the method of the invention provides that the sulfates that form are captured in a particle filter. Suitable for the purpose are especially particle filters in the form of filter cartridges which are easily replaceable. The particle filter or filter cartridge is advantageously placed in the exhaust tract, e.g., in the final muffler in a motor vehicle where the particle filter is easy to reach, and thus can easily be installed and replaced.

The additive according to the invention is especially well suited for use in Otto-cycle and Diesel engines, both in passenger cars and in utility vehicles.

An embodiment of the present invention will be explained herewith. A preferred additive is a salt or complex compound of barium. Barium reacts almost completely to barium sulfate and causes the sulfur present to precipitate in the form of barium sulfate particles.

In an oxidizing atmosphere (lambda≧1) barium oxide forms from the barium compound that is soluble in the fuel. At the same time the sulfur contained in the fuel oxidizes to sulfur dioxide or sulfur trioxide. In the course of combustion the barium oxides react with the sulfur dioxide or sulfur trioxide to form stable barium sulfate:

$$BaO + SO_3 \rightarrow BaSO_4$$

$$BaO + SO_2 + \tfrac{1}{2}O_2 \rightarrow BaSO_4$$

The barium sulfate is blown out of the internal combustion engine in the form of particles and enters the exhaust gas. It settles in the exhaust tract or is blown out. If a particle filter is inserted into the end muffler of a motor vehicle the barium sulfate can also be selectively trapped.

The reaction just described applies to all divalent metals which form stable sulfates. All metals which are soluble in fuel, e.g., in Otto-cycle engine fuel or Diesel fuel, preferably in the form of inorganic or organometallic complex compounds, especially in the form of organometallic complex salts, are suitable for the neutralization of sulfur dioxide or sulfur trioxide. This is true, for example, of barium, magnesium, calcium, strontium, molybdenum, cadmium, lead, vanadium, chromium, manganese, iron, cobalt, nickel, copper and zinc in the form of the salts of inorganic or organic acids.

What is claimed is:

1. A method for neutralizing at least one of $SO_2$ or $SO_3$ in the exhaust gases of a fuel-powered internal combustion engine of motor vehicles, which are equipped with a $NO_x$-storage catalytic converter, consisting of the steps of:

adding an additive to the fuel, said additive is soluble in said fuel and consisting essentially of at least one barium compound selected from the group consisting of inorganic and organometallic complex compounds, whereby when the fuel burns in an oxidizing atmosphere, solid stable sulfate particles are formed; and discharging said solid stable sulfate particles.

2. The method according to claim 1, wherein the barium compound is a salt of inorganic or organic acids.

3. The method according to claim 1, wherein the barium compound is a salt of inorganic or organic complex compounds.

4. The method according to claim 2, wherein the barium compound is a salt of inorganic or organic complex compounds.

5. The method according to claim 1, wherein said discharging step includes capturing the discharged sulfates in a particle filter.

6. The method according to claim 5, wherein the particle filter is in the form of a filter cartridge.

7. The method according to claim 5, wherein therefor the particle filter in the exhaust gas stream.

8. The method according to claim 7, wherein the particle filter is placed in a final muffler.

9. A method for neutralizing $SO_2$ and $SO_3$ in the exhaust gases of a fuel-powered internal combustion engine of motor vehicles, which are equipped with a $NO_x$-storage catalytic converter, consisting of the steps of:

adding an additive to the fuel, said additive is soluble in said fuel and consisting essentially of at least one barium compound selected from the group consisting of inorganic and organometallic complex compounds, whereby when the fuel burns in an oxidizing atmosphere, solid stable sulfate particles are formed; and discharging said solid stable sulfate particles.

10. A method for neutralizing $SO_2$ and $SO_3$ in Otto-cycle and Diesel motors of passenger cars and utility vehicles operated with fuel and are equipped with a $NO_x$-storage catalytic converter, consisting of the steps of:

adding an additive to the fuel, said additive is soluble in said fuel and consisting essentially of at least one barium compound selected from the group consisting of inorganic and organometallic complex compounds, whereby when the fuel burns in an oxidizing atmosphere, solid stable sulfate particles are formed; and discharging said solid stable sulfate particles.

* * * * *